US008561886B2

(12) United States Patent
Bleck et al.

(10) Patent No.: US 8,561,886 B2
(45) Date of Patent: Oct. 22, 2013

(54) SELF-SERVICE DEVICE

(75) Inventors: Frank Bleck, Paderborn (DE); Peter Golueke, Paderborn (DE)

(73) Assignee: Wincor Nixdorf International GmbH (DE)

(*) Notice: Subject to any disclaimer, the term of this patent is extended or adjusted under 35 U.S.C. 154(b) by 243 days.

(21) Appl. No.: 12/919,556

(22) PCT Filed: Feb. 18, 2009

(86) PCT No.: PCT/EP2009/001118
§ 371 (c)(1),
(2), (4) Date: Aug. 26, 2010

(87) PCT Pub. No.: WO2009/112142
PCT Pub. Date: Sep. 17, 2009

(65) Prior Publication Data

US 2010/0328867 A1 Dec. 30, 2010

(30) Foreign Application Priority Data

Mar. 14, 2008 (DE) ........................ 10 2008 014 324

(51) Int. Cl.
*G07F 19/00* (2006.01)
*G06K 5/00* (2006.01)
*G06F 7/08* (2006.01)

(52) U.S. Cl.
USPC ............................ 235/379; 235/380; 235/381

(58) Field of Classification Search
USPC ........................ 235/379–381; 705/35, 39, 43
See application file for complete search history.

(56) References Cited

U.S. PATENT DOCUMENTS

| | | | | |
|---|---|---|---|---|
| 5,748,728 | A * | 5/1998 | Ginsberg et al. | 379/447 |
| 6,144,319 | A * | 11/2000 | Lutz et al. | 341/22 |
| 6,543,684 | B1 | 4/2003 | White et al. | |
| 7,168,613 | B2 * | 1/2007 | Douglass et al. | 235/379 |
| 7,337,955 | B1 | 3/2008 | Block et al. | |
| 7,611,045 | B1 * | 11/2009 | Lute et al. | 235/379 |
| 2006/0151597 | A1 * | 7/2006 | Scanlon | 235/379 |
| 2007/0290033 | A1 | 12/2007 | Kweon et al. | |
| 2009/0107815 | A1 * | 4/2009 | Day et al. | 200/310 |
| 2011/0089231 | A1 * | 4/2011 | Artino et al. | 235/379 |

FOREIGN PATENT DOCUMENTS

| | | | |
|---|---|---|---|
| DE | 197 39 771 | A1 | 3/1999 |
| DE | 203 01 132 | U1 | 3/2003 |
| DE | 102 29 673 | A1 | 1/2004 |
| DE | 10 2005 002 622 | A1 | 8/2006 |
| DE | 20 2005 020911 | U1 | 11/2006 |
| DE | 20 2006 019288 | U1 | 5/2007 |
| FR | 2892548 | A1 | 4/2007 |
| WO | WO-97/39558 | A1 | 10/1997 |
| WO | WO 2006043074 | A2 * | 4/2006 |
| WO | WO 2006120479 | A2 * | 11/2006 |

* cited by examiner

*Primary Examiner* — Thien M Le
*Assistant Examiner* — April Taylor
(74) *Attorney, Agent, or Firm* — Harness, Dickey & Pierce, P.L.C.

(57) ABSTRACT

A self-service device, particularly an automated cash machine, having an operating unit with an operating panel for entering alphanumeric characters and/or control data, and having a cover surface having a plurality of edges bounding a recess, whereby the operating panel is encompassed, wherein at least one first edge of the cover surface is disposed at a distance from a first edge of the operating panel, forming an intermediate space, wherein a functional strip is disposed, the functional strip being mounted on a mounting frame encompassing the operating panel, said frame being connected to the cover surface by mounting elements.

20 Claims, 2 Drawing Sheets

SELF-SERVICE DEVICE

CROSS-REFERENCE TO RELATED APPLICATIONS

This application is a National Stage of International Application No. PCT/EP2009/001118, filed Feb. 18, 2009. This application claims the benefit and priority of German application 10 2008 014 324.3 filed Mar. 14, 2008. The entire disclosures of the above applications are incorporated herein by reference.

BACKGROUND

This section provides background information related to the present disclosure which is not necessarily prior art.

1. Technical Field

The invention relates to a self-service device, particularly an automated cash machine, having an operating unit comprising an operating panel for entering alphanumeric characters and/or control data and having a cover surface having a plurality of edges bounding a recess, whereby the operating panel is encompassed.

2. Discussion

A self-service device is known from DE 197 39 771 A1 comprising an operating unit having an operating panel for entering alphanumeric characters and/or control data. A sensor unit is assigned to the operating panel serving to detect an overlay attached to the operating panel with fraudulent intent by swindlers. This overlay is an operating panel prepared by the swindler, by means of which key operations of the person using the self-service device can be spied out. However, the sensor unit requires the placement of sensors above a plane of extension of the operating panel, which is undesirable with respect to the risk of vandalism.

A self-service device having an operating unit is known from DE 10 2005 002 622 A1 that provides an operating panel for entering alphanumeric characters and/or control data. The operating panel is set in a recess of a cover surface of the operating unit, with narrow edges of a recess in the cover surface abutting directly against edges of the operating panel. A visual protection element is assigned to the operating panel that is raised around the edges of the operating panel and protects a user of the self-service device from unwanted viewing by outsiders when entering alphanumeric characters. The visual protection element has dome-shaped attaching means around the edges that engage holes in the cover surface so that the visual protection element can be mounted on an underside of the cover surface by a snap ring or a nut engaging the inserted dome-shaped mounting element. The disadvantage of the known self-service device is that when attaching the security element to the cover surface an adjustment must be undertaken regarding the type of attachment or the location of the attachment of the operating unit itself to the cover surface.

SUMMARY OF THE INVENTION

An object of the present invention is to further develop a self-service device in such a manner that the installation of an operating unit on a cover surface of the self-service device can be simplified, and in particular fraudulent misuse of the operating unit can be reduced in a simple way.

To achieve this object, the invention-is characterized in that at least one first edge of the cover surface is disposed at a distance from a first edge of the operating panel, forming an intermediate space wherein a functional strip is disposed, and the functional strip being mounted to a mounting frame encompassing the operating panel, said frame being attached to the cover surface by mounting elements.

By creating a functional strip at the edge of an operating panel, the invention makes it practicable to provide security-related functions at a specified location. The functional strip can, for example, serve to attach a security element and/or as protection against an overlay.

The particular advantage of the invention lies in the fact that two defined attachment areas are created by providing a functional strip. Firstly, the functional strip can act as an adapter or as a functional component that is attached in a defined first attachment area, namely in an intermediate space between a first edge of the recess and an edge of the operating panel, to a mounting frame of the operating unit. Secondly, the attachment of the operating unit is carried out via the mounting frame to the cover surface in a defined second attaching area that is disposed next to the first attaching area in the direction of an operating plane. A locally independent attachment, for example, between a security element and the functional strip on the one hand and the operating unit and the cover surface on the other can be achieved as a result.

In accordance with a first embodiment of the invention, the functional strip can include retaining means so that a visual protection element can be attached to the functional strip. Advantageously, the attachment of the visual protection element can be made in an attaching area that is set apart from an attaching area in which the operating unit is attached to the cover surface.

In accordance with a further embodiment of the invention, an upper side of the functional strip is disposed elevated relative to an adjacent upper side of the cover surface and/or the operating plane of the operating panel. As a result of this elevation, protection against an overlay becomes practicable that makes it easier to detect the unauthorized installation of an overlay with fraudulent intent above the operating panel. The preferably raised configuration of the functional strip acts here as a spacer for the unauthorized overlay so that, because of the relatively large separation of the overlay from the cover surface, the presence of the overlay can be detected more easily by a user of the self-service device. The operating security of the self-service device can thereby be advantageously increased.

In accordance with a further embodiment of the invention, a functional strip is configured such that it overlaps the edge of the cover surface in some areas. As a result, the functional strip lies partially on top of the cover surface, which makes unauthorized forcible depression of the operating panel perpendicular to the operating plane more difficult. Effective counteraction can thus be taken against installation of an "overlaid" operating panel keypad undertaken with fraudulent intent.

In accordance with a refinement of the invention, an upper side of the functional strip tapers continuously toward the upper side of the cover surface, so that the functional strip has no sharp edges on a side facing the cover surface. As a result, the construction of the operating panel is visually attractive and reduces the risk of injury, while the upper side of the functional strip can act as a guide surface for the issuance of sheet-shaped objects in the presence of a dispensing slot located in the vicinity.

BRIEF DESCRIPTION OF THE DRAWINGS

Embodiments of the invention are explained in greater detail in what follows with the help of the drawings.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

The self-service device in accordance with the invention can be configured as an automated cash machine, for example, having a housing in which a card reader, a cash dispensing unit for dispensing banknotes, a display unit for displaying alphanumeric and/or graphical information, and an operating unit 1 for entering alphanumeric characters and/or control data are disposed.

Figure 1:
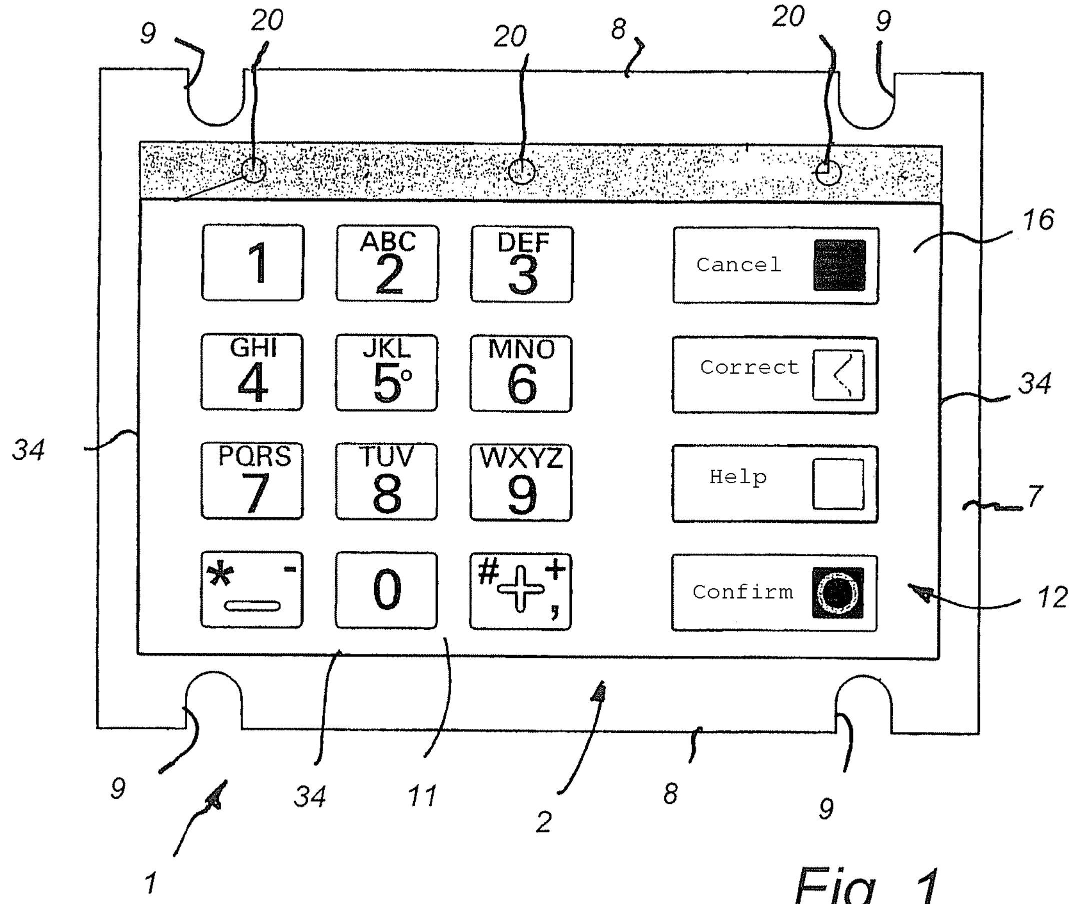
FIG. 1 shows a schematic plan view of an operating unit of a self-service device having a functional strip in accordance with a first embodiment.
Figure 2:
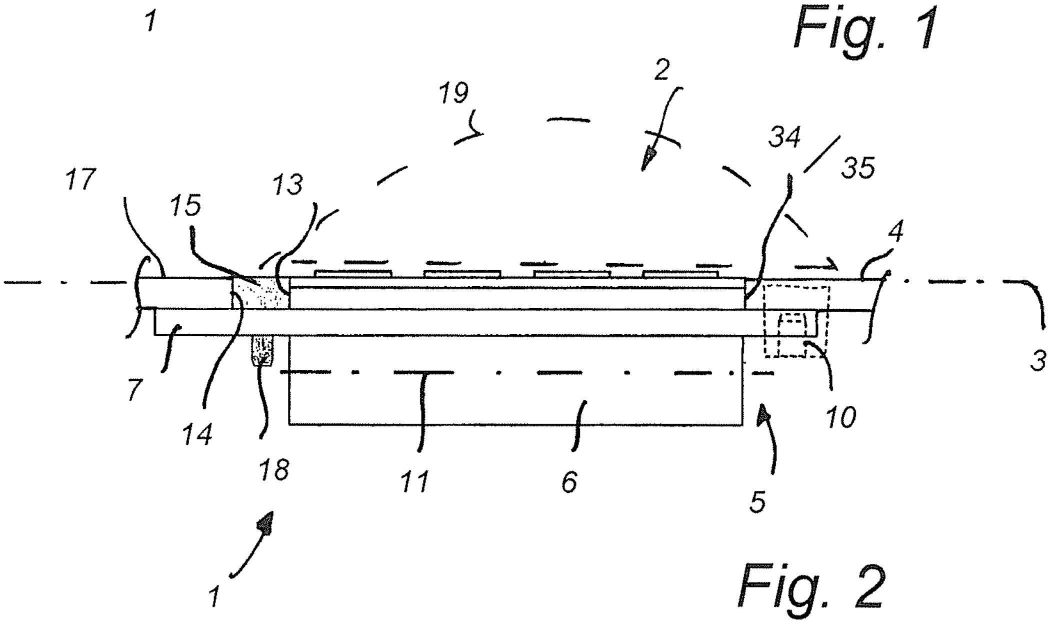
FIG. 2 shows a side view of the operating unit in the installed state with a visual protection element attached to the functional strip in accordance with a first embodiment.

The operating unit 1 in accordance with one embodiment from FIGS. 1 and 2 has an operating panel 2 consisting of a plurality of keys that extends in an operating panel plane essentially flush to a cover surface 4 of the housing. The cover surface 4 has a recess 5 in which the operating unit 1 is carried. The operating unit 1 has, in addition to the operating panel 2, a base body 6 that extends essentially below the cover surface 4. The base body 6 is solidly encompassed by a mounting frame 7 that runs parallel to the operating panel plane 3 or to the cover surface 4 on one side of a center plane M of the base body 6 facing the operating panel 2. The mounting frame 7 has recesses 9 on opposite longitudinal sides in the usual manner so that it can be attached via mounting elements 10, such as screws, to one edge of the cover surface 4.

The operating panel 2 contains as operating elements firstly a PIN pad 11 (numeric pad) to enter alphanumeric characters. For example, a confidential numeric code (PIN) or the amount of a sum of money to be withdrawn from his bank account can be entered thereon by the user. Secondly, the operating panel 2 has function keys 12 to enter control data.

An electronic module is integrated into the base body 6 that contains an encoding unit to encode the data entered by the user of the self-service device by means of the operating keys 11. The security of the data transfer can thereby be increased.

In accordance with the first embodiment of the invention, a functional strip 15, rectangular in cross-section, extends in an intermediate space between a longitudinal first edge 13 of the operating panel 2 and a longitudinal first edge 14 of the recess 9. The functional strip 15 is of a thickness that it runs flush with an adjacent upper side 16 of the operating panel 2 and an upper side 17 of the cover surface 4. The functional strip 15 is attached by a positive-locking and/or interference-fit connection or is materially bonded to the mounting frame 7. In the present embodiment, the functional strip 15 is connected by a threaded fastener 18 to the mounting frame 7.

The functional strip 15 contains holes 20 disposed distributed in the lengthwise direction of the functional strip 15 as retaining means to anchor a visual protection element 19 to said strip. The holes 20 can have an internal thread so that the dome-shaped visual protection element 19 can be attached to the functional strip 15 by threaded fasteners. The visual protection element 19 is elevated in the installed state, partially enclosing the operating panel 2 so that entry of a confidential numeric code by the user is protected from the view of third parties.

In accordance with an alternative embodiment not shown, the functional strip 12 can comprise mounts or recesses on an underside facing the mounting frame 7 as retaining means so that matching retaining means are held clamped after the functional strip 15 has been fastened to the mounting frame 7. The visual protection element 19 can be configured, for example, from a flexible, thermoplastic synthetic material.

As can be seen from FIG. 1, the length of the functional strip 15 matches the length of the operating panel 2. The functional strip 15 acts, as it were, as an adapter for the optional mounting of the visual protection element 19. The functional strip 15 is disposed in a first attachment area in which the visual protection element 19 can be installed on the operating unit 1. A second attachment area extends perpendicular to the functional strip 15 in which mounting elements 10 for the mounting frame 7 are disposed to attach the operating unit 1 to the cover surface 4 of the housing.

If it is desirable to provide the operating unit 1 without integration of a visual protection element 19, the functional strip 15 can act as a "blind strip" that does not have any mounting members 20 on the upper side if required. As an alternative, or in addition, the upper side of the functional strip 15 can be used for applying a company name or a company logo or other information.

Figure 3:
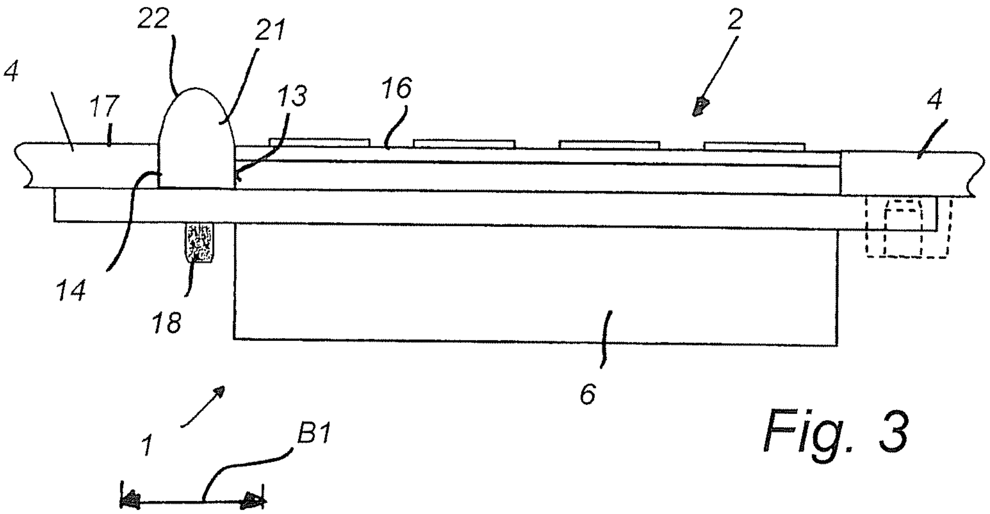
FIG. 3 shows a side view of the operating unit in the installed state with a functional strip in accordance with a second embodiment.

In accordance with a second embodiment of the invention from FIG. 3, a functional strip 21 is configured in cross-section shaped like a bead, a dome or a mushroom, where an upper side 22 of the functional strip 21 is disposed elevated relative to the adjacent upper side 16 of the operating panel 2 and the upper side 17 of the cover surface 4. For the rest, the dimension of the functional strip 21 matches the dimension of the functional strip 15 in accordance with the first embodiment of the invention.

Identical components or component functions of the embodiments are given identical reference numbers.

The upper side 22 of the functional strip 21 is configured arcuate in cross-section. As a result of the functional strip 21 projecting above the operating plane 3, the installation of an overlay mounted with fraudulent intent above the operating panel 2 can be detected more readily by an unsuspecting user since a gap results between the overlay and the cover surface 4.

Figure 4:
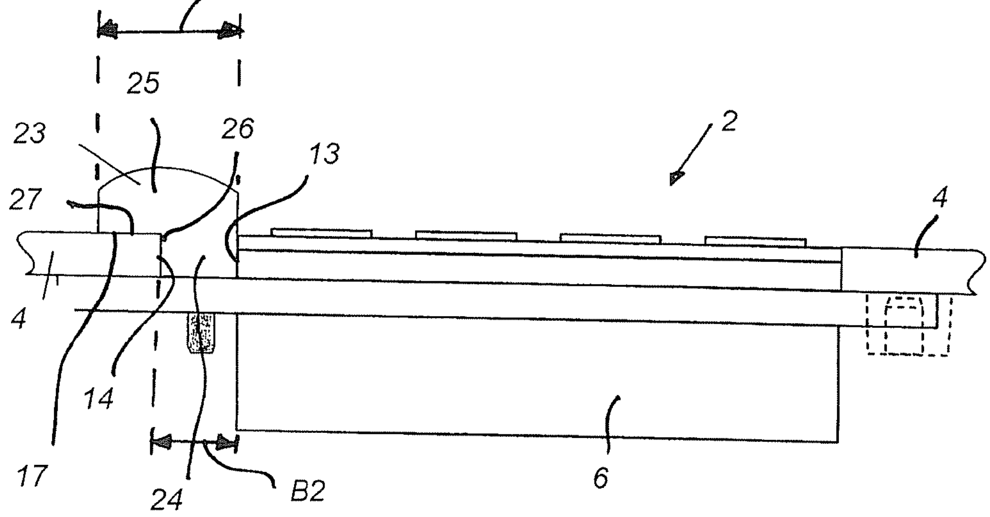
FIG. 4 shows a side view of the operating unit in the installed state with a functional strip in accordance with a third embodiment.

In accordance with a further embodiment of the invention from FIG. 4, a functional strip 23, angular in cross-section, is provided that fills the intermediate space between the first edge 13 of the operating panel 2 and the first edge 14 of the cover surface 4 with a first leg 24 and that overlaps one edge of the upper side 17 of the cover surface 4 with a second leg 25. The two legs 24, 25 are disposed at a right angle to each other forming an L-shaped step wherein a first stepped surface 26 of the first leg 24 sits flush with the first edge 14 of the cover surface 4 and a second stepped surface 27 sits flush against the edge of the upper side 17 of the cover surface. As a result of overlapping the functional strip 23 by means of the second leg 25, it is possible to provide improved anchoring of the operating panel 2 or the operating unit 1 to the cover surface 4 that counteracts undesirable depression of the operating unit 1 toward the interior of the housing in order to facilitate installation of an overlay with fraudulent intent.

As can be seen from FIG. 4, a width 81 of the second leg 25 is greater than a width B2 of the intermediate space, or of the second leg 25. The second leg 25 of the functional strip 23 forms the section of the functional strip 23 that overlaps one edge of the cover surface 4.

The functional strip 23 has an upper surface 28, arcuate in cross-section. The first stepped surface 27 can, for example, include mounts or recesses on an underside of said surface to receive engaging elements of the visual protection element 19 so that simple attachment of the visual protection element 19 to the functional strip 23 is assured.

Figure 5:
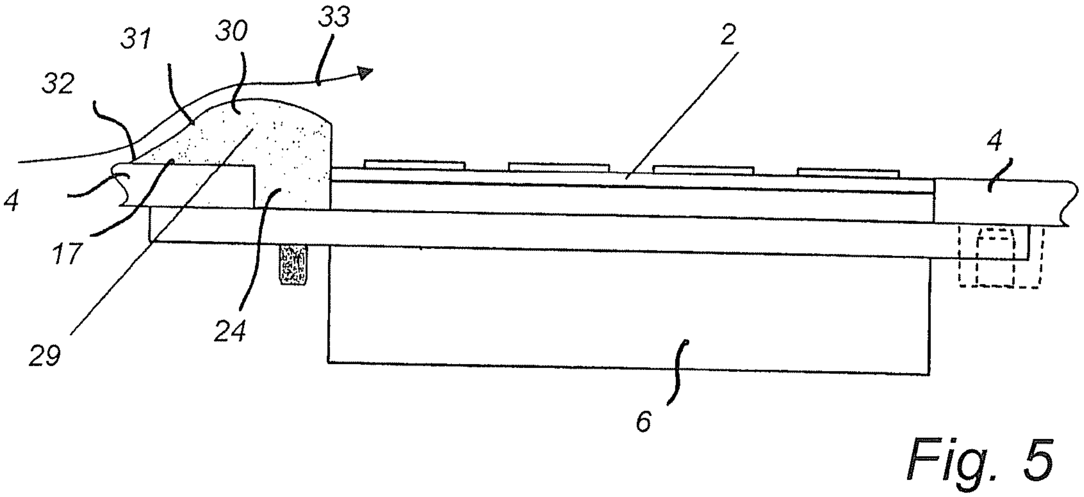
FIG. 5 shows a side view of the operating unit in the installed state with a functional strip in accordance with a fourth embodiment.

In accordance with a further embodiment of the invention in accordance with FIG. 5, a functional strip 29 can be provided that, in contrast to the functional strip 23 according to the third embodiment, tapers off constantly at an upper second leg 30 toward the upper side 17 of the cover surface 4. The second leg 30 of the functional strip 29 has an upper side 31 whose edge 32 facing away from the operating panel 2 comes immediately to rest on the upper side 17 of the cover surface 4. Advantageously, the upper side 31 can act as a guide surface for paper valuables that are dispensed via an adjacent dispensing slot in the housing, as is indicated by the arrow 33.

The operating panel 2 has additional edges 34 next to the first edge 13 that abut immediately against matching edges 35 of the cover surface 4. In this area the upper side 16 of the operating panel 2 runs flush with the upper side 17 of the cover surface 4.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. Self-service device, particularly an automated cash machine, having an operating unit comprising an operating panel for entering alphanumeric characters and/or control data and having a cover surface having a plurality of edges bounding a recess, whereby the operating panel is encompassed, characterized in that:

at least one first edge of the cover surface is disposed at a distance from a first edge of the operating panel, forming an intermediate space, wherein a functional strip is disposed, and in that the functional strip is mounted on a mounting frame encompassing the operating panel, said frame being connected to the cover surface by mounting elements;

wherein the at least one first edge of the cover surface is opposite to and faces the first edge of the operating panel.

2. Self-service device from claim 1, wherein the functional strip has retainers to retain a visual protection element that rises in the manner of a dome from an operating panel plane of the operating panel.

3. Self-service device from claim 2, wherein the retainers are configured as mounts that are disposed on an underside of the functional strip facing away from the plane of the operating panel.

4. Self-service device from claim 1, wherein an upper side of the functional strip is disposed elevated relative to an adjacent upper side of the cover surface and/or an upper side of the operating panel.

5. Self-service device from claim 1, wherein the functional strip rises in a bead shape from a plane of the operating panel, where at least one partial area of an edge of the functional strip lies directly against the first edge of the cover surface and/or the first edge of the operating panel.

6. Self-service device from claim 1, wherein the functional strip at least partially has a width (B1) that is greater than a width (B2) of the intermediate space such that a section of the functional strip overlaps one edge of the cover surface.

7. Self-service device from claim 1, wherein the functional strip includes an angled step on a side facing the cover surface, a first cover surface that lies flat against the first edge of the cover surface and a second cover surface that lies flat against an upper side of the cover surface.

8. Self-service device from claim 1, wherein an upper side of the functional strip is configured in cross-section as an arcuate shape.

9. Self-service device from claim 1, wherein an upper side of the functional strip tapers constantly towards an upper side of the cover surface, wherein an edge of the upper side of the functional strip comes to rest on the upper side of the cover surface.

10. Self-service device from claim 1, wherein additional edges of the operating panel not facing the functional strip lie directly against edges of the cover surface, wherein the adjacent upper sides of the operating panel or the cover surface run flush with one another.

11. Self-service device from claim 1, wherein the mounting frame is solidly attached to the operating unit.

12. Self-service device from claim 1, wherein the operating panel of the operating unit runs substantially above the mounting frame and a base body adjoins the operating panel, said body running substantially below the mounting frame.

13. Self-service device from claim 1, wherein an electronic module is integrated in a base body of the operating unit to encode the data entered by means of the operating panel.

14. An automated cash machine comprising:

a cover surface including a plurality of cover edges defining an opening;

an operating panel for entering data, the operating panel seated within the opening such that the operating panel is surrounded by the cover surface, the operating panel including a plurality of operating panel edges;

an intermediate space defined between a first cover edge of the plurality of cover edges and a first operating panel edge of the plurality of operating panel edges, the first cover edge is spaced apart from the first operating panel edge, the first cover edge is opposite to and faces the first operating panel edge;

a functional strip disposed within the intermediate space; and a mounting frame encompassing the operating panel and connected to the cover surface by mounting elements, the functional strip is mounted on the mounting frame.

15. The automated cash machine of claim 14, wherein other than the first cover edge and the first operating panel edge, each one of the plurality of cover edges lie directly against a different one of the plurality of operating panel edges; and wherein an upper surface of the cover surface and an upper surface of the operating panel run flush with one another and extend in a common plane.

16. The automated cash machine of claim 14, wherein an upper side of the functional strip that is opposite to the cover surface tapers constantly towards an upper side of the cover surface; and wherein an edge of the upper side of the functional strip abuts the upper side of the cover surface.

17. The automated cash machine of claim 14, wherein the functional strip includes retainers to retain a visual protection element including a dome that is configured to extend across at least a portion of the operating panel.

18. The automated cash machine of claim 14, wherein an upper surface of the functional strip extends in a plane that is spaced apart from, and is above, an operating surface of the operating panel.

19. An automated cash machine comprising:

a cover surface defining an opening;

an operating panel for entering data, the operating panel seated within the opening; and a mounting strip arranged in an intermediate space between the cover surface and the operating panel, the mounting strip includes retainers to retain a visual protection element including a dome that extends across at least a portion of the operating panel.

20. The automated cash machine of claim 19, wherein:

the cover surface includes a plurality of cover edges defining the opening;

the operating panel includes a plurality of operating panel edges;

the intermediate space is defined between a first cover edge of the plurality of cover edges and a first operating panel edge of the plurality of operating panel edges, the first cover edge is spaced apart from the first operating panel edge;

other than the first cover edge and the first operating panel edge, each one of the plurality of cover edges lie directly against a different one of the plurality of operating panel edges; and an upper surface of the cover surface and an upper surface of the operating panel run flush with one another and extend in a common plane.

* * * * *